US011952835B2

(12) United States Patent
Anderson et al.

(10) Patent No.: US 11,952,835 B2
(45) Date of Patent: Apr. 9, 2024

(54) SELF-VENTING WEEP HOOD FOR WATER MANAGEMENT OF FENESTRATION UNITS

(71) Applicant: Pella Corporation, Pella, IA (US)

(72) Inventors: Derek D. Anderson, Otley, IA (US); Jeremy D. Parr, Knoxville, IA (US)

(73) Assignee: Pella Corporation, Pella, IA (US)

( * ) Notice: Subject to any disclaimer, the term of this patent is extended or adjusted under 35 U.S.C. 154(b) by 47 days.

(21) Appl. No.: 17/162,901

(22) Filed: Jan. 29, 2021

(65) Prior Publication Data

US 2021/0238917 A1 Aug. 5, 2021

Related U.S. Application Data

(60) Provisional application No. 62/968,500, filed on Jan. 31, 2020.

(51) Int. Cl.

*E06B 7/14* (2006.01)
*E06B 1/36* (2006.01)
*E06B 1/70* (2006.01)
*E06B 7/10* (2006.01)

(52) U.S. Cl.

CPC .................. *E06B 7/14* (2013.01); *E06B 1/36* (2013.01); *E06B 1/702* (2013.01); *E06B 7/10* (2013.01); *E06B 1/70* (2013.01)

(58) Field of Classification Search

CPC ... E06B 7/14; E06B 1/36; E06B 1/702; E06B 7/10; E06B 1/70; E06B 7/02; E06B 7/26; E06B 9/52

USPC ............................................... 52/209, 204.52

See application file for complete search history.

(56) References Cited

U.S. PATENT DOCUMENTS

| | | | | | |
|---|---|---|---|---|---|
| RE24,077 | E * | 10/1955 | Ensminger | E06B 3/2605 160/90 |
| 6,883,279 | B2 | 4/2005 | Fukuro et al. | |
| 7,574,829 | B1 | 8/2009 | Prager | |
| 7,637,058 | B2 | 12/2009 | Lai | |
| 8,256,162 | B2 | 9/2012 | Reithmeyer et al. | |
| 8,448,384 | B2 * | 5/2013 | Wernlund | E06B 7/14 49/471 |
| 9,863,183 | B2 * | 1/2018 | Johnson | E06B 7/14 |
| 2006/0150521 | A1 * | 7/2006 | Henry | E06B 1/70 49/471 |
| 2009/0199486 | A1 * | 8/2009 | Wernlund | E06B 1/70 49/471 |
| 2018/0298677 | A1 * | 10/2018 | Alkhoury | E06B 1/70 |
| 2020/0232269 | A1 * | 7/2020 | Eisenbarth | E06B 3/5828 |

FOREIGN PATENT DOCUMENTS

KR 100937358 B1 * 1/2010 ............... E06B 7/00

* cited by examiner

*Primary Examiner* — Brian D Mattei
*Assistant Examiner* — Omar F Hijaz
(74) *Attorney, Agent, or Firm* — FAEGRE DRINKER BIDDLE & REATH

(57) ABSTRACT

Various aspects of the present disclosure are directed toward apparatuses, systems, and methods that include a sill, a head opposite the sill, a first jamb, and a second jamb opposite the first jamb forming a window cavity therebetween, the sill including a lower surface and an upper surface and one or more compartments therebetween; and a weep hood arranged in the sill and configured to allow water and air to exit the one or more compartments within the sill.

16 Claims, 5 Drawing Sheets

SELF-VENTING WEEP HOOD FOR WATER MANAGEMENT OF FENESTRATION UNITS

CROSS REFERENCE TO RELATED APPLICATIONS

The present application claims the benefit of U.S. Provisional Patent Application No. 62/968,500 filed Jan. 31, 2020, which is incorporated herein by reference in their entirety.

TECHNICAL FIELD

Various aspects of the present disclosure relate to multipoint locks for doors or windows. In some specific examples, various aspects of the present disclosure are directed toward apparatuses, systems, and methods that include a multipoint lock operable by a thumb turn.

BACKGROUND

Water ingress into fenestration units, which include both doors and windows, is one consideration in product design, construction, and installation. For example, in order to reduce the likelihood of moisture ingress into a dwelling or other structure, door and window assemblies include sealing systems (e.g., gaskets, flanges, and the like) between a unit's frame and panel(s). As might be expected, moisture intrusion is more problematic in situations where there is increased atmospheric moisture and pressure (e.g., as is often the case near oceans or during rain storms).

In instances where water does enter the fenestration units, there may be a need for relief or outflow of the water while also maintaining the pressure differential within the fenestration unit.

SUMMARY

According to one example ("Example 1"), a fenestration unit includes a sill, a head opposite the sill, a first jamb, and a second jamb opposite the first jamb forming a window cavity therebetween, the sill including a lower surface and an upper surface and one or more compartments therebetween; and a weep hood arranged in the sill and configured to allow water and air to exit the one or more compartments within the sill.

According to another example ("Example 2"), further to the fenestration unit of Example 1, the weep hood includes one or more water vents and one or more air vents.

According to another example ("Example 3"), further to the fenestration unit of Example 2, the sill includes at least one side wall separating the one or more compartments within the sill from an exterior or interior side of the sill, and the weep hood is arranged within the at least one sidewall and contacts the lower surface of the sill.

According to another example ("Example 4"), further to the fenestration unit of Example 3, the weep hood includes a first portion configured to reside within the one or more compartments and a second portion configured to reside outside the one or more compartments, and the first portion of the weep hood includes the one or more water vents includes an inlet extending parallel to at least a portion of the lower surface of the sill and one or more air vents includes an inlet extending substantially perpendicular to at least a portion of the lower surface of the sill.

According to another example ("Example 5"), further to the fenestration unit of Example 4, the second portion of the weep hood includes an outlet of the one or more water vents extending substantially perpendicular to at least a portion of the lower surface of the sill.

According to another example ("Example 6"), further to the fenestration unit of Example 5, the second portion of the weep hood includes an outlet of the one or more air vents extending substantially perpendicular to at least a portion of the lower surface of the sill.

According to another example ("Example 7"), further to the fenestration unit of Example 2, the one or more water vents are adjacent the one or more air vents.

According to another example ("Example 8"), further to the fenestration unit of Example 2, the one or more water vents are configured to allow water flow out of the window cavity without water column buildup within the one or more compartments within the sill.

According to another example ("Example 9"), further to the fenestration unit of Example 2, the one or more air vents are configured to maintain the window cavity at a pressure that is substantially equal to an exterior pressure.

According to another example ("Example 10"), further to the fenestration unit of Example 2, the one or more water vents are configured to allow water flow without impeding air flow through the one or more air vents.

According to one example ("Example 11"), a fenestration unit includes a sill, a head opposite the sill, a first jamb, and a second jamb opposite the first jamb forming a window cavity therebetween, the sill including a lower surface and an upper surface and one or more compartments therebetween; and a weep hood arranged in the sill and including one or more water vents having one or more inlets arranged within the component and parallel to the lower surface of the window cavity being configured to allow water to exit the one or more compartments within the sill, and one or more air vents having one or more inlets perpendicular to the lower surface of the window cavity being configured to air to exit the one or more compartments within the sill.

According to another example ("Example 12"), further to the fenestration unit of Example 11, an upper boundary of the inlets of the one or more water vents have less of a height than the inlets of the one or more air vents.

According to another example ("Example 13"), further to the fenestration unit of Example 11, an exterior portion of the weep hood includes one or more outlets of the one or more water vents adjacent one or more outlets of the one or more air vents.

According to another example ("Example 14"), further to the fenestration unit of Example 11, the one or more water vents includes two water vents and the one or more air vents includes an air vent, and outlets of the two water vents are arranged on either side of an outlet of the air vent.

According to another example ("Example 15"), further to the fenestration unit of Example 11, the one or more water vents are configured to allow water flow out of the window cavity without water column buildup within the one or more compartments within the sill.

According to another example ("Example 16"), further to the fenestration unit of Example 11, the one or more air vents are configured to maintain the window cavity at a pressure that is substantially equal to an exterior pressure.

According to another example ("Example 17"), further to the fenestration unit of Example 11, the one or more water vents are configured to allow water flow without impeding air flow through the one or more air vents.

According to one example ("Example 18"), a method of managing water and air for a fenestration unit having a sill, a head opposite the sill, a first jamb, and a second jamb opposite the first jamb forming a window cavity therebetween, the sill including a lower surface and an upper surface and one or more compartments therebetween includes arranging a weep hood arranged in the sill; and allowing water to exit the one or more compartments within the sill through the weep hood without water column buildup within the one or more compartments within the sill and without impeding air flow through the weep hood; and maintaining the window cavity at a pressure that is substantially equal to an exterior pressure.

According to another example ("Example 19"), further to the method of Example 18, the weep hood includes one or more water vents and one or more air vents and the one or more water vents are adjacent the one or more air vents.

According to another example ("Example 20"), further to the method of Example 19, the one or more water vents having one or more inlets arranged within the component and parallel to the lower surface of the window cavity being configured to allow water to exit the one or more compartments within the sill, and one or more air vents having one or more inlets perpendicular to the lower surface of the window cavity being configured to air to exit the one or more compartments within the sill.

The foregoing Examples are just that, and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Figure 1:
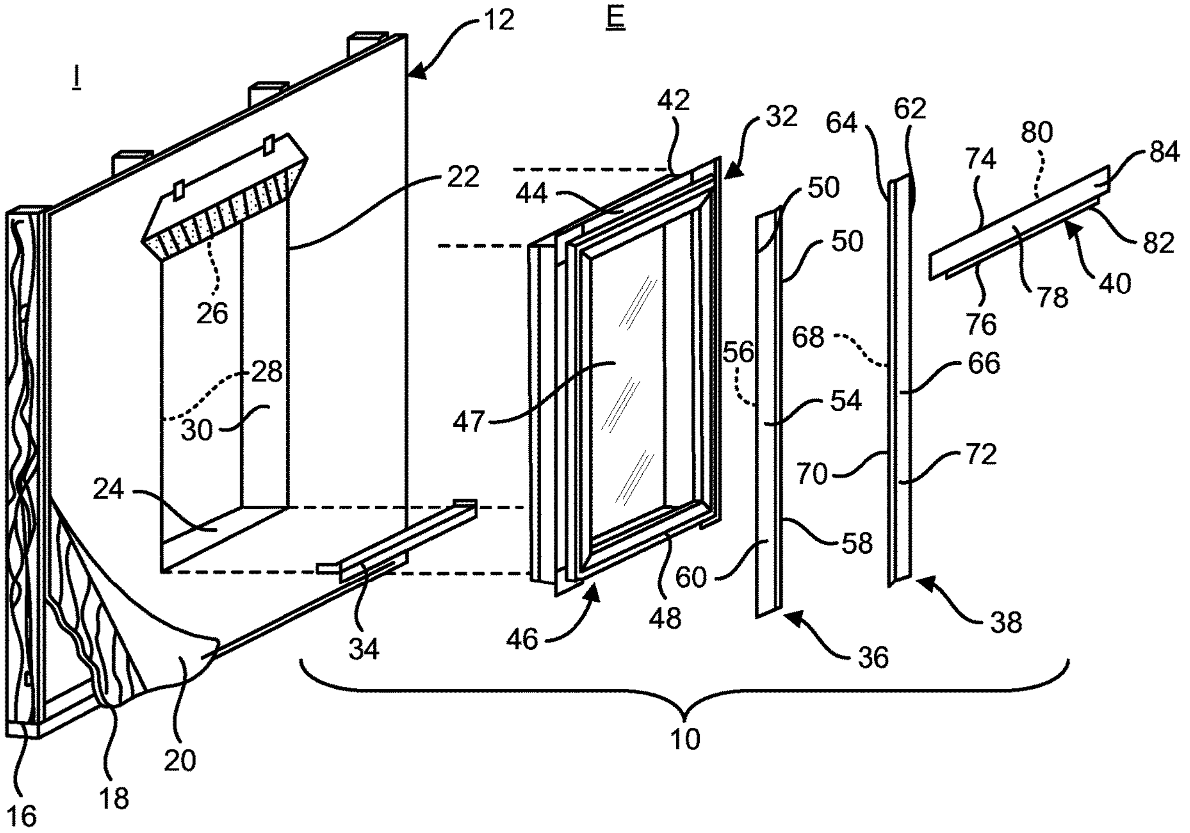
FIG. 1 shows an exploded view of fenestration unit installed in building structure, having exterior side and interior side, according to some examples.

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

Various aspects of the present disclosure are directed toward apparatuses, systems, and methods that include a weep hood, arranged in a sill, configured to allow water and air to exit one or more compartments within the sill. The weep hood, in certain instances, is configured to weep water from the unit while maintain cavity pressure within the unit as substantially the same as an exterior window pressure. In addition, the weep hood weeps water without pressure relief holes in other portions of the fenestration unit.

FIG. 1 shows an exploded view of fenestration unit 32 installed in building structure 12, having exterior side E and interior side I, according to some examples. Building structure 12 may include structural framing members 16, sheathing layer 18, and optionally, water barrier layer 20. Building structure 12 may also include rough opening 22 formed by sill 24, head 26 opposite sill 20, first jamb 28, and second jamb 30 opposite first jamb 28. Framing members 16 may be, for example, wooden or steel studs. Sheathing layer 18 may be, for example, oriented strand board or plywood. Water barrier layer 20 may be a film layer or sheet that prevents liquid water from passing through building structure 12 between exterior side E and interior side I.

Framing members 16 may be assembled to form a mechanical support for building structure 12. Sill 24, head 26, first jamb 28 and second jamb 30 may be attached to framing members 16, and to each other by, for example nails, screws, and/or other mechanical fastening means, to form rough opening 22. Sheathing layer 18 may be attached to a side of framing members 16, sill 24, head 26, first jamb 28, and second jamb 30 facing exterior E by, for example, nails, screws and/or other mechanical fastening means. Water barrier layer 20 may cover a side of sheathing layer 18 that faces exterior E by, for example, nails, staples, brads, screws, and/or an adhesive. Building structure 12 may optionally include additional water barrier layers (not shown) and/or sheathing layers (not shown) attached to a side of framing members 16, sill 24, head 26, first jamb 28, and second jamb 30 facing interior I. A weep hood, as shown in detail below, may be coupled to or arranged with a portion of the sill 24.

As also shown in FIG. 1, a fenestration unit 32 is shown to be placed within building structure 12. The fenestration unit may include frame 42 and sash assembly 46. The sash assembly 46 surrounds a window pane 47 and connects window pane 47 to frame 42. The sash assembly 46 includes sill, head, first jamb and second jamb frame elements The frame 42 may include a window cavity for the window pane 47.

Additional or alternative fenestration unit features are described in literature and embodied in products available from Pella Corporation of Pella, Iowa, including those presently sold under the trade name, "DESIGNER SERIES," "ARCHITECT SERIES," AND "PROLINE SERIES." Examples of sliding glass door and sliding glass window products are also available from Pella Corporation.

Figure 2:
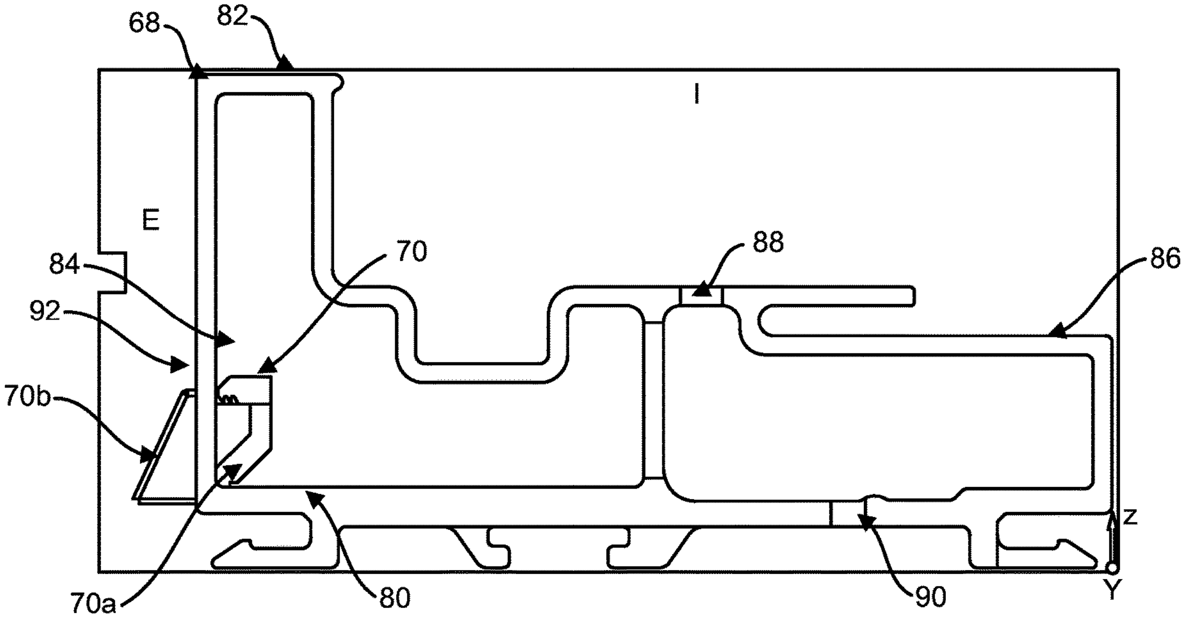
FIG. 2 shows side view of an example sill and an example weep hood, according to some examples.

FIG. 2 shows side view of an example sill frame element 68 and an example weep hood 70, according to some examples. As noted above, the example sill frame element 68 may form a portion of a frame 42 for a fenestration unit 32. The frame 42 is formed by sill 68, a head opposite the sill 68, a first jamb, and a second jamb opposite the first jamb, and a window cavity therebetween. As shown, the sill 68 may include a lower surface 80, an upper surface 82 and one or more compartments 84, 86 therebetween. In addition, the sill 68 may include one or more drains 88, 90 for water to run through the sill 68.

In addition and as show, the weep hood 70 may be arranged in the sill 68. The weep hood 70 may be configured to allow water and air to exit the one or more compartments 84, 86 within the sill 68. In certain instances and as discussed in further detail below, the weep hood 70 may include one or more air vents and one or more water vents. The weep hood 70 may be a unitary structure formed of a plastic or metal material that includes the one or more air vents and one or more water vents.

In certain instances, the sill 68 includes at least one side wall 92 separating one or more of the compartments 84, 86 within the sill 68 from an exterior or interior side of the sill 68. The weep hood 70 may be arranged within (and spanning) the sidewall 92 which is separates the window exterior from the window cavity. The weep hood 70 may include a first portion 70*a* that is configured to reside within the one or more compartments 84, 86 (e.g., compartment 84) and a second portion 70*b* configured to reside outside the one or more compartments 84, 86. The one or more water vents and the one or more air vents include pathways from the first portion 70*a* of the weep hood 70 to the second portion 70*b* of the weep hood 70. The one or more water vents and the one or more air vents pair or vent air and water from the window cavity or one or more of the compartments 84, 86 to an exterior side of the sill 68 and fenestration unit. The second portion 70*b* of the weep hood 70 may include a slope extending outwardly relative to the side wall 92. The first portion 70*a* of the weep hood 70 may also include a slope.

Figure 3:
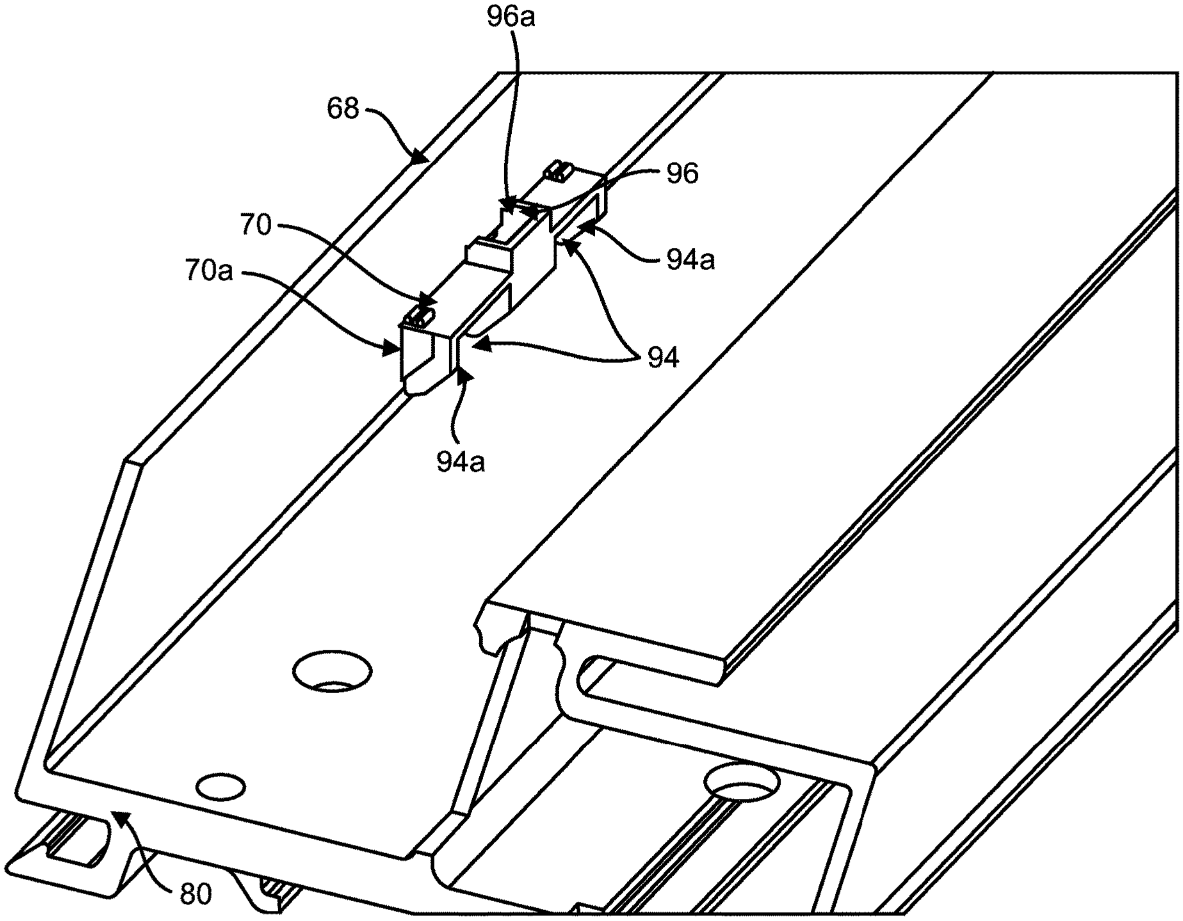
FIG. 3 shows a top down perspective view of an example sill and an example weep hood, according to some examples.

FIG. 3 shows a top down perspective view of an example sill 68 and an example weep hood 70, according to some examples. FIG. 3 shows a first portion 70*a* or interior portion of the weep hood 70. As noted above, the weep hood 70 may be arranged within (and spanning) the sidewall 82 which is separates the window exterior from the window cavity. In addition, the first portion 70*a* or interior portion of the weep hood 70 may contact a lower surface 80 of the sill 68.

As noted above, the weep hood 70 includes one or more water vents 94 and one or more air vents 96. In certain instances, the one or more water vents 94 include inlets 94*a* on the first portion 70*a* side of the weep hood 70. In addition, the one or more air vents 96 include inlets 96*a* on the first portion 70*a* side of the weep hood 70. The weep hood 70 may include a single or multiple water vents 94 and the a single or multiple air vents 96. As shown, the weep hood 70 includes two water vents 94 and one air vent 96.

In certain instances, the inlets 94*a* of the water vents 94 extend substantially parallel to at least a portion of the lower surface 80 of the sill 68. In addition, the inlets 96*a* of the one or more air vents 96 extending substantially perpendicular to at least a portion of the lower surface 80 of the sill 68. The inlets 94*a* of the water vents 94 may be aligned with or not substantially raised from the lower surface 80 of the sill 80 in certain instances. The inlets 94*a* of the water vents 94 may facilitate draining water from the fenestration unit without water building to a certain level within the fenestration unit. The water vents 94 may be configured to allow water flow out of the window cavity without water column buildup within the one or more compartments within the sill 68.

In certain instances, the water vents 94 are configured to allow water flow without impeding air flow through the air vents 96. As shown, the air vent 96 extends substantially perpendicular to or in a direction different than the water vents 94. In this manner, water may drain through the water vents 94 without obstructing the air vents 96. In certain instances, an upper boundary of the inlets 94*a* of the water vents 94 has less of a height than the inlets 96*a* of the air vents 96.

Figure 4:
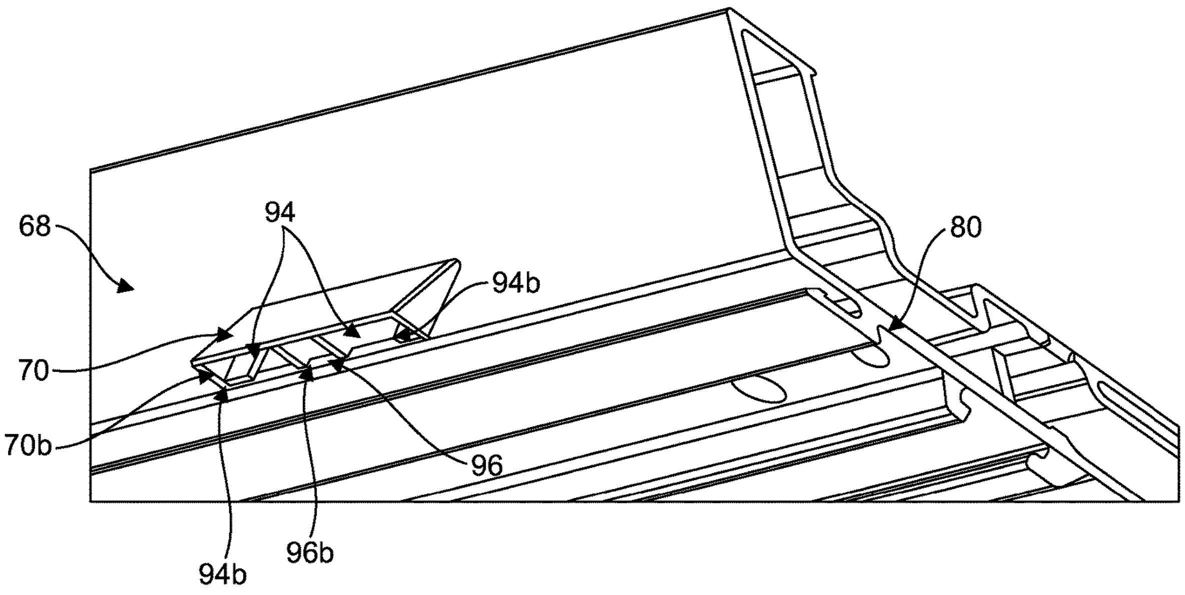
FIG. 4 shows an external bottom up perspective view of an example sill and an example weep hood, according to some examples.

FIG. 4 shows an external bottom up perspective view of an example sill 86 and an example weep hood 70, according to some examples. As noted above, the weep hood 70 includes one or more water vents 94 and one or more air vents 96. In certain instances, the one or more water vents 94 include outlets 94*b* on a second portion 70*b* side of the weep hood 70. In addition, the one or more air vents 96 include inlets 96 on the second portion 70*b* side of the weep hood 70.

In certain instances, the outlets 94*b* of the one or more water vents 94 extend substantially perpendicular to at least a portion of the lower surface 80 of the sill 68. In addition and in certain instances, the outlets 96*b* of the one or more air vents 96 extend substantially perpendicular to at least a portion of the lower surface 80 of the sill 68. The outlets 94*b* of the water vents 94 and the outlets 96*b* of the air vents 96 may be arranged adjacent to one another. In certain instances, the outlets 94*b* of the water vents 94 are arranged on either side of the outlet 96*a* of the air vent 96.

In addition, the one or more air vents 96 are configured to maintain the window cavity at a pressure that is substantially equal to an exterior pressure. The air vents 96 in the weep hood 70 may eliminate additional (e.g., drilled) pressure relief holes that may have been used in other portions of the fenestration unit frame.

As noted above, the second portion 70*b* of the weep hood 70 may include a slope extending outwardly relative to the side wall 92. The outlets 94*b* and outlets 96*b* may be arranged under or be covered by the slope of the second portion 70*b* of the weep hood 70.

Figure 5:
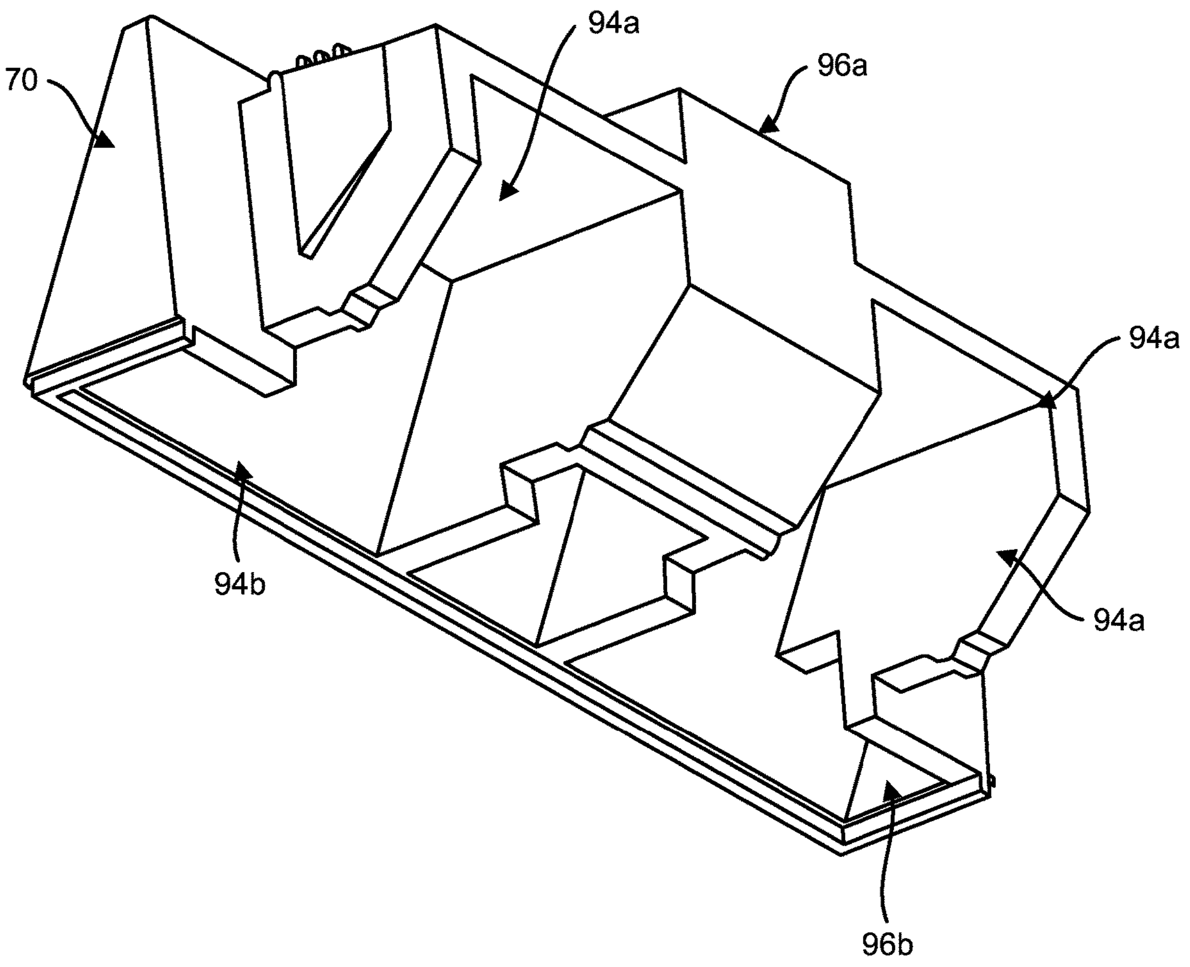
FIG. 5 shows an example weep hood, according to some examples.

FIG. 5 shows an example weep hood 70, according to some examples. The weep hood 70 may be configured to facilitate maintaining the window cavity pressure remaining similar to or substantially the same as exterior pressure. This allows for the one or more water vents 94 to weep or drain water without pressure relief holes in other parts of the fenestration unit. The weep hood 70 may also allow for other cavities or compartments of the fenestration unit to remain at interior pressure and reduce air circulation inside the unit.

As shown, the water vents 94 are adjacent the air vent 96. The weep hood 70 allows for water and air to escape without impeding each other. The weep hood 70 may be arranged within other portions of the fenestration unit such as between compartments (as shown in FIG. 2) to draw water (and equalize air pressure) into the other cavities or compartments of the fenestration unit. This arrangement may also facilitate circulation of air.

As noted above, the inlets 94*a* of the water vents 94 may also drawing water without a water column height that breaks the hydrostatic forces on the unit in order to drain. The weep hood 70 lessens the risk of failing a water test that can occur in water vents that use building a water column height to drain water. In addition, the weep hood 70 may improve aesthetic of the unit by not requiring additional visible holes in the exterior of the unit.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A fenestration unit comprising:

a sill, a head opposite the sill, a first jamb, and a second jamb opposite the first jamb forming a window cavity therebetween, the sill including a lower surface and an upper surface and one or more compartments therebetween, and the sill including at least one side wall having an opening extending therethrough and the at least one side wall separates the one or more compartments within the sill from an exterior or interior side of the sill; and a weep hood arranged within the at least one sidewall and contacting the lower surface of the sill, the weep hood including one or more air vents and one or more water vents, the weep hood arranged within the opening of the at least one side wall of the sill such that at least a portion of the weep hood projects outwardly from the sill, and the weep hood configured to simultaneously allow water to exit the one or more compartments within the sill through the one or more water vents and allow air to enter the one or more compartments within the sill through the one or more air vents, wherein the weep hood includes a first portion configured to reside within the one or more compartments and a second portion configured to reside outside the one or more compartments, and the first portion of the weep hood includes the one or more water vents including an inlet extending parallel to at least a portion of the lower surface of the sill, and the first portion includes an inlet of the one or more air vents extending substantially perpendicular to at least a portion of the lower surface of the sill.

2. The fenestration unit of claim 1, wherein the second portion of the weep hood includes an outlet of the one or more water vents extending substantially perpendicular to at least a portion of the lower surface of the sill.

3. The fenestration unit of claim 2, wherein the second portion of the weep hood includes an outlet of the one or more air vents extending substantially perpendicular to at least a portion of the lower surface of the sill.

4. The fenestration unit of claim 1, wherein the one or more water vents are adjacent the one or more air vents.

5. The fenestration unit of claim 1, wherein the one or more water vents are configured to allow water flow out of the window cavity without water column buildup within the one or more compartments within the sill.

6. The fenestration unit of claim 1, wherein the one or more air vents are configured to maintain the window cavity at a pressure that is substantially equal to an exterior pressure.

7. The fenestration unit of claim 1, wherein the one or more water vents are configured to allow water flow without impeding air flow through the one or more air vents.

8. The fenestration unit of claim 1, wherein at least one inlet of the one or more air vents is angularly offset from at least one inlet of the one or more water vents.

9. The fenestration unit of claim 1, wherein the at least one air vent is positioned between a first water vent and a second water vent.

10. A fenestration unit comprising:

a sill, a head opposite the sill, a first jamb, and a second jamb opposite the first jamb forming a window cavity therebetween, the sill including a lower surface and an upper surface and one or more compartments therebetween; and a weep hood arranged in the sill and including one or more water vents having one or more inlets arranged within the one or more compartments and parallel to the lower surface of the window cavity being configured to allow water to exit the one or more compartments within the sill and one or more outlets defining an external feature directly exposed to an exterior environment, and one or more air vents having one or more inlets perpendicular to the lower surface of the window cavity being configured to allow air to exit the one or more compartments within the sill; and wherein an upper boundary of the one or more inlets of the one or more water vents is defined by a first vertical height and an upper boundary of the one or more inlets of the one or more air vents is defined by a second vertical height, the first vertical height being less than the second vertical height.

11. The fenestration unit of claim 10, wherein an exterior portion of the weep hood includes the one or more outlets of the one or more water vents adjacent the one or more outlets of the one or more air vents.

12. The fenestration unit of claim 11, wherein the one or more water vents includes two water vents and the one or more air vents includes an air vent, and outlets of the two water vents are arranged on either side of an outlet of the air vent.

13. The fenestration unit of claim 10, wherein the one or more water vents are configured to allow water flow out of the window cavity without water column buildup within the one or more compartments within the sill.

14. The fenestration unit of claim 10, wherein the one or more air vents are configured to maintain the window cavity at a pressure that is substantially equal to an exterior pressure.

15. The fenestration unit of claim 10, wherein the one or more water vents are configured to allow water flow without impeding air flow through the one or more air vents.

16. The fenestration unit of claim 10, wherein the weep hood includes a first portion configured to reside within the one or more compartments and a second portion configured to reside outside the one or more compartments, and the first portion of the weep hood includes the one or more inlets of the one or more air vents.

* * * * *